(12) United States Patent
Saito et al.

(10) Patent No.: US 8,752,968 B2
(45) Date of Patent: Jun. 17, 2014

(54) PROJECTOR

(75) Inventors: Masahiro Saito, Shiojiri (JP); Keisuke Sakagami, Azumino (JP); Yukihiro Horiko, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 229 days.

(21) Appl. No.: 13/411,916

(22) Filed: Mar. 5, 2012

(65) Prior Publication Data

US 2012/0242966 A1   Sep. 27, 2012

(30) Foreign Application Priority Data

Mar. 23, 2011  (JP) ................................ 2011-064035

(51) Int. Cl.
*G03B 21/14* (2006.01)

(52) U.S. Cl.
USPC ............................ 353/100; 353/101; 353/119

(58) Field of Classification Search
CPC ......... G03B 21/145; G02B 7/02; G02B 7/022
USPC .......... 353/100, 101, 119; 359/819, 802, 818, 359/822, 827
See application file for complete search history.

(56) References Cited

U.S. PATENT DOCUMENTS

| 5,618,094 | A  | * | 4/1997  | Lee .............................. 353/101 |
| 7,527,385 | B2 | * | 5/2009  | Lin .............................. 353/101 |
| 8,061,849 | B2 | * | 11/2011 | Hsieh et al. ..................... 353/52 |
| 8,068,293 | B2 | * | 11/2011 | Kuroda ......................... 359/819 |
| 8,118,437 | B2 | * | 2/2012  | Otsuki .......................... 353/119 |
| 2003/0071978 | A1 | * | 4/2003 | Lung et al. .................... 353/100 |
| 2009/0086172 | A1 |   | 4/2009  | Otsuki |

FOREIGN PATENT DOCUMENTS

| JP | 2009-086198 A | 4/2009 |
| JP | 2010-211114 A | 9/2010 |

* cited by examiner

*Primary Examiner* — William C Dowling
(74) *Attorney, Agent, or Firm* — ALG Intellectual Property, LLC

(57) ABSTRACT

A projector includes: a light source; a light modulation device configured to modulate light emitted from the light source according to image information; a projection lens configured to project the light modulated by the light modulation device; a holding unit that holds the projection lens; an external housing that accommodates the projection lens and the holding unit; and a clamping portion that projects from the inner surface of the external housing and clamps the projection lens or the holding unit in a direction substantially perpendicular to the optical axis of the projection lens.

7 Claims, 7 Drawing Sheets

PROJECTOR

BACKGROUND

1. Technical Field

The present invention relates to a projector.

2. Related Art

There is a projector known in the art which includes a light modulation device modulating light emitted from a light source according to image information, and a projection lens projecting the light modulated by the light modulation device, as an apparatus capable of projecting an image on a screen or other projection surfaces (for example, see JP-A-2010-211114). In recent years, such a projector has been also proposed which has a short-focus lens capable of projecting an image from a position near the projection surface (proximity projection).

The projector disclosed in JP-A-2010-211114 includes an optical component housing, and a holding unit attached to the optical component housing. The optical component housing accommodates optical systems in the range from the light source up to the light modulation device. The holding unit holds the projection lens (projection device). A protrusion which projects in the direction perpendicular to the optical axis is attached to the side surface of the optical component housing.

According to the technology disclosed in JP-A-2010-211114, however, the projection lens may fall down or shift with respect to the optical component housing, or the optical component housing may break, which conditions occur in some cases by the weight of the projection lens, or shock or the like applied to the projector. When the fall or shift of the projection lens or the breakage of the optical component housing is caused, the optical axis of the projection lens shifts from the optical axis of the optical systems contained in the optical component housing, in which condition the quality of the projected image deteriorates. When the projection lens is provided with the short-focus lens capable of performing proximity projection, this problem becomes more serious due to the heavier weight of the projection lens.

SUMMARY

An advantage of some aspects of the invention is to provide a technology capable of solving at least a part of the aforementioned problems, and the invention can be implemented as the following forms or application examples.

This application example of the invention is directed to a projector including a light modulation device configured to modulate light emitted from a light source according to image information, and a projection lens configured to project the light modulated by the light modulation device. The projector further includes a holding unit that holds the projection lens, an external housing that accommodates the projection lens and the holding unit, and a clamping portion that projects from the inner surface of the external housing and clamps the projection lens or the holding unit in a direction substantially perpendicular to the optical axis of the projection lens.

According to this structure, the projection lens or the holding unit that holds the projection lens is clamped by the clamping portion projecting from the external housing in the direction perpendicular to the optical axis. In this case, shift of the projection lens is regulated in the direction perpendicular to the optical axis, wherefore the predetermined position of the projection lens is maintained in a stable condition without positional shift or fall of the projection lens caused by the weight of the projection lens or shock or vibration given to the projector. Thus, deterioration of the image quality caused by the weight of the projection lens, shock or others can be avoided even when the projector includes the heavy projection lens provided with a short-focus lens capable of performing proximity projection, for example. Accordingly, the projector can achieve projection of high-quality images.

In the projector of the above application example, it is preferable that the external housing has a first housing and a second housing disposed opposed to each other with respect to a virtual plane containing the optical axis. In this case, the clamping portion is provided on each of the first housing and the second housing.

According to this structure, the external housing has the first housing and the second housing disposed opposed to each other with respect to the virtual plane containing the optical axis. Moreover, the clamping portion is provided on each of the first housing and the second housing. In this case, the projection lens or the holding unit can be clamped by fixation between the first housing and the second housing. Thus, the predetermined position of the projection lens can be maintained in a more stable condition along with reduction of the number of components and contribution to space saving than in a structure which constitutes the clamping portion by a component other than the external housing.

In the projector of the above application example, it is preferable that the holding unit has a clamped portion clamped by the clamping portion, and an attachment portion to which the light modulation device is attached.

According to this structure, the holding unit that holds the projection lens or the light modulation device is clamped by the clamping portion. In this case, highly accurate positioning of the projection lens with respect to the light modulation device can be maintained. Moreover, positional shift or fall of the projection lens caused by the weight of the projection lens or shock or vibration given to the projector can be prevented. Therefore, light modulated by the light modulation device enters the projection lens with high accuracy, which allows the projector to achieve projection of high-quality images.

In the projector of the above application example, it is preferable that the projector further includes an optical component housing that accommodates the light source and the light modulation device, and has a fixing portion fixed to the external housing. In this case, the holding unit has a clamped portion clamped by the clamping portion, and is attached to the optical component housing. The clamped portion is disposed at a position shifted from the light modulation device toward the downstream side with respect to the direction of the optical path. The fixing portion is disposed at a position shifted from the light modulation device toward the upstream side with respect to the direction of the optical path and on one side with respect to a virtual vertical plane containing the optical axis.

According to this structure, the projection lens is attached via the holding unit to the optical component housing that has the fixing portion. In this case, the optical component housing is temporarily fixed to a part of the components constituting the external housing before the projection lens or the holding unit is clamped. Accordingly, the manufacture of the projector can be simplified.

In addition, the clamped portion is disposed on the downstream side of the light modulation device with respect to the direction of the optical path, while the fixing portion is disposed on the upstream side of the light modulation device with respect to the direction of the optical path and on one side with respect to the virtual vertical plane containing the optical axis. In other words, the fixing portion is located on the side opposite to the clamped portion with respect to the light modulation device in such a position as not to cross over the optical axis. According to this arrangement, loads such as distortion between the optical component housing and the projection lens can be reduced, which loads may be caused when the clamped portion is clamped by the clamping portion after fixation of the optical component housing to the part of the components constituting the external housing. Therefore, the optical component housing and the projection lens can be highly accurately disposed at the predetermined positions.

Accordingly, simplification of the manufacture of the projector, and stable positioning of the projection lens and the optical components contained in the optical component housing at the predetermined locations can be both achieved.

In the projector of the above application example, it is preferable that the projection lens includes a lens barrel accommodating a plurality of lenses, and a rotary member which shifts at least one of the plural lenses by rotation with respect to the lens barrel, and is disposed at a position shifted from the clamped portion toward the downstream side with respect to the direction of the optical path.

The rotary member is constituted by a component capable of controlling zoom or focus of an image to be projected, for example. According to this structure, the rotary member is provided on the downstream side of the clamped portion with respect to the direction of the optical path. Thus, the clamping portion and the clamped portion can be easily formed even in the structure containing the projection lens capable of controlling zoom and focus. When the rotary member is rotated, a force is applied to the projection lens in such a direction that the projection lens falls down. However, since the clamped portion is disposed in the vicinity of the rotary member, the moment applied to the projection lens becomes smaller. Thus, deterioration of the image quality caused by fall of the projection lens during zoom control or focus control can be reduced.

In the projector of the above application example, it is preferable that the clamping portion has a first clamping portion and a second clamping portion provided on one and the other side, respectively, of the virtual vertical plane containing the optical axis such that the virtual vertical plane can be located between the first and second clamping portions.

According to this structure, the first clamping portion and the second clamping portion hold the projection lens or the holding unit from both sides thereof with respect to the optical axis of the projection lens. In this case, shift of the projection lens in the direction perpendicular to the optical axis is regulated on both sides with respect to the optical axis. Thus, positional shift and fall of the projection lens caused by the weight of the projection lens or shock or vibration given to the projector can be further reduced.

In the projector of the above application example, it is preferable that the projection lens has a flange disposed close to the center of gravity of the projection lens. In this case, the flange is supported by the holding unit.

According to this structure of the projection lens, the flange disposed close to the center of gravity of the projection lens is supported by the holding unit, in which condition the holding unit is clamped via the clamped portion connected with the flange. Thus, the predetermined position of the projection lens can be maintained in a more stable condition.

BRIEF DESCRIPTION OF THE DRAWINGS

The invention will be described with reference to the accompanying drawings, wherein like numbers reference like elements.

DESCRIPTION OF EXEMPLARY EMBODIMENT

A projector according to the invention is hereinafter described with reference to the drawings.

The projector in this embodiment modulates light emitted from a light source according to image information, and projects an enlarged image corresponding to the modulated light on a screen or other projection surfaces.

Figure 1:
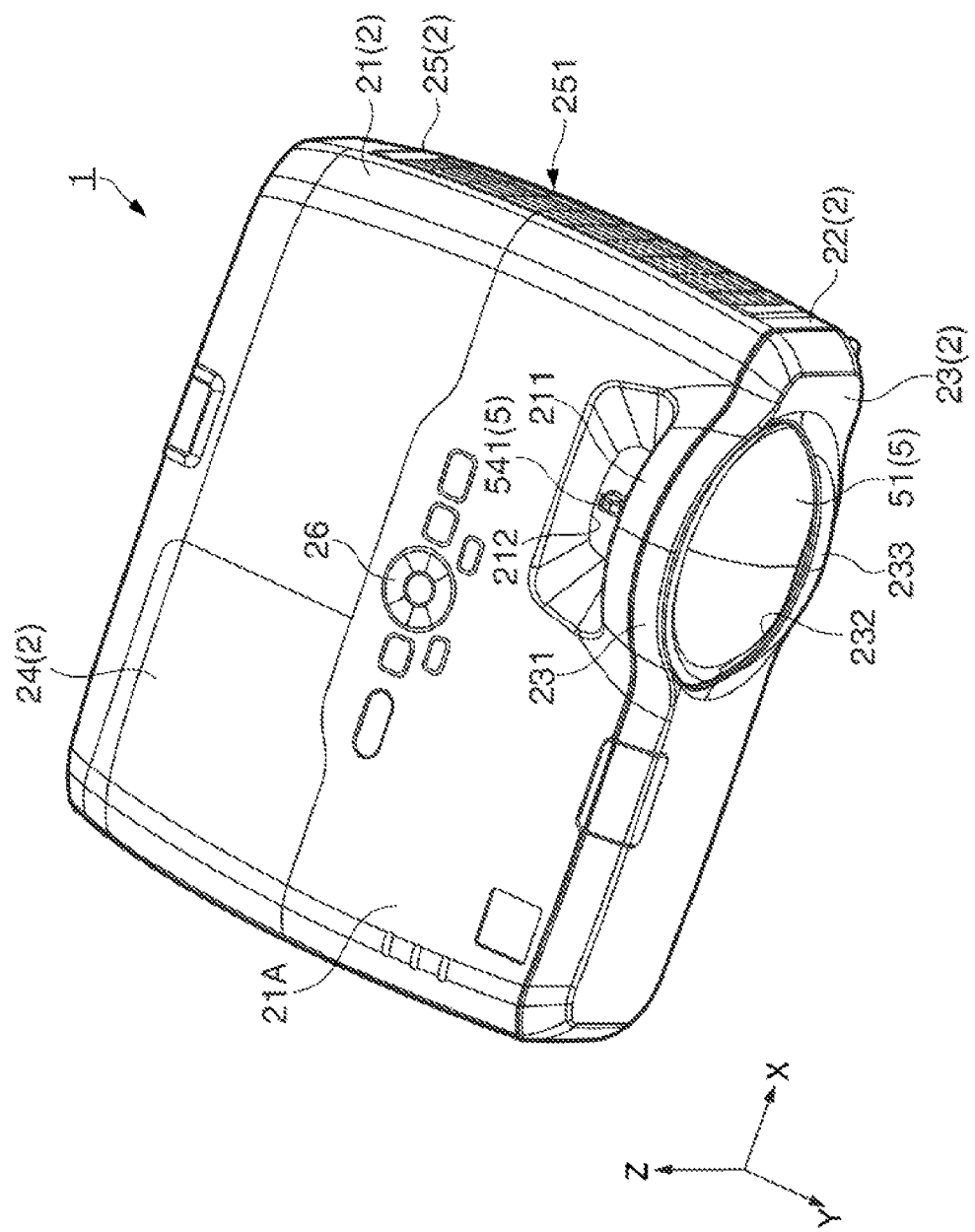
FIG. 1 is a perspective view illustrating the external appearance of a projector according to an embodiment.
Figure 2:
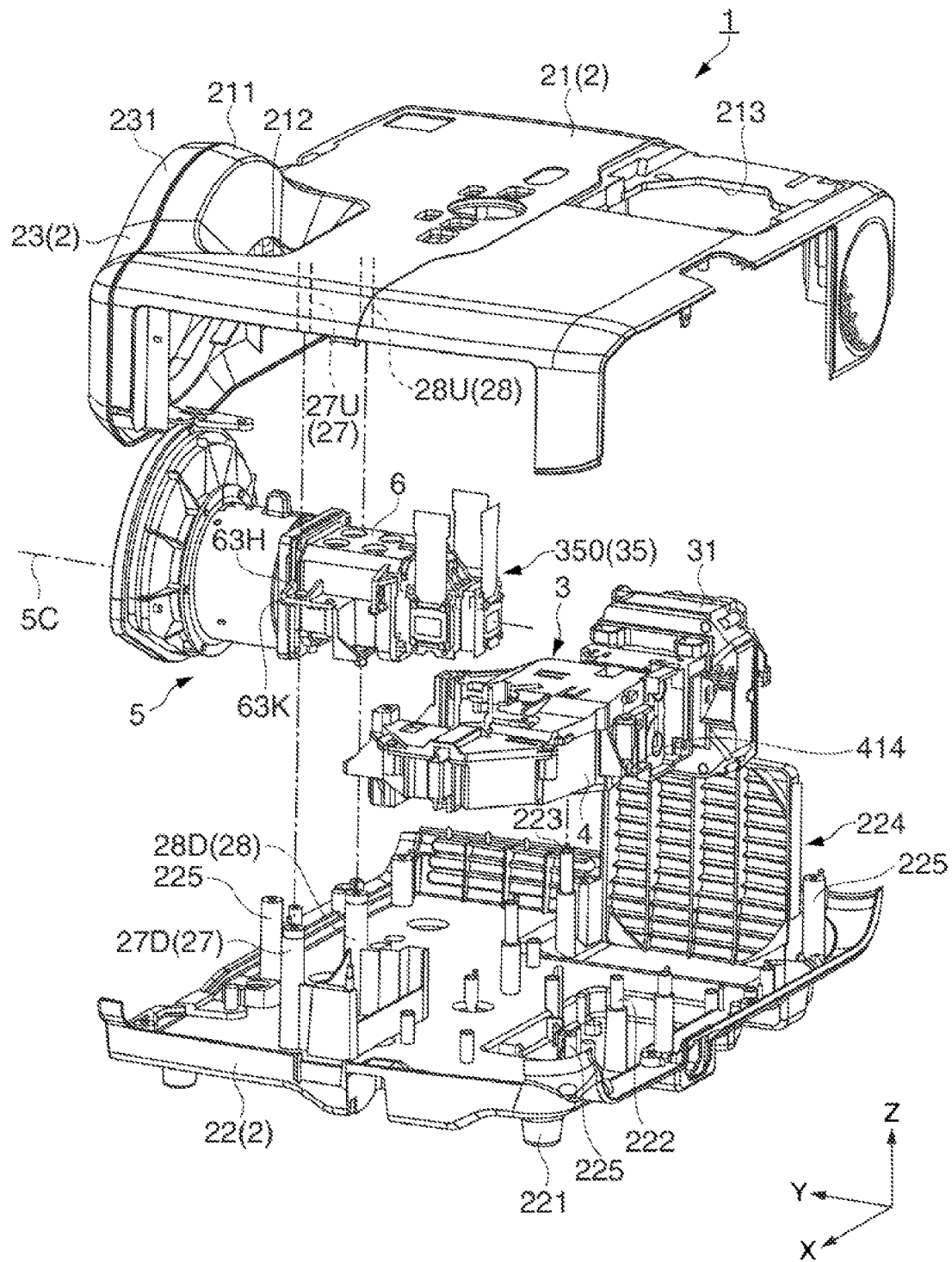
FIG. 2 is a perspective view of the projector according to the embodiment in a disassembled condition.

FIG. 1 is a perspective view illustrating the external appearance of a projector 1 according to this embodiment. FIG. 2 is a perspective view of the projector 1 in a disassembled condition, a part of components of which are not shown.

As illustrated in FIGS. 1 and 2, the projector 1 includes an external housing 2 constituting the external case, a control unit (not shown), and an optical unit 3 containing a light source device 31, a projection lens 5, and other components.

The external housing 2 accommodates a fan for supplying air which cools the interior of the projector 1 and a duct for introducing the air, a power source device for supplying power to the control unit, the light source device 31 and other components, and other units as well as the control unit and the optical unit 3. These fan, duct, the power source device, and other units are not specifically shown in the figures. In the following description, the direction of light emission from the light source device 31 corresponds to a +X direction (right direction), the direction of light projection from the projector 1 corresponds to a +Y direction (front direction), and the upward direction in FIG. 1 corresponds to a +Z direction (upward direction).

Structure of External Housing

The external housing 2 is made of synthetic resin, and includes an upper case 21 as a first housing, a lower case 22 as a second housing, a front case 23, a lamp cover 24, a side case 25, and other parts as illustrated in FIG. 1. These cases 21 through 25 are fixed to each other via screws or the like.

As illustrated in FIGS. 1 and 2, the upper case 21 constitutes the upper part of the external housing 2, while the lower case 22 constitutes the lower part of the external housing 2. The upper case 21 and the lower case 22 are disposed opposed to each other with respect to a virtual plane (X–Y plane) containing an optical axis 5C of the projection lens 5.

As illustrated in FIG. 1, an upper surface 21A of the upper case 21 has a plurality of openings disposed substantially at the center of the upper surface 21A, through which openings a plurality of operation keys 26 associated with operation of the projector 1 are exposed. An opening 213 (see FIG. 2) to which the light source device 31 is detachably attached is provided at a position of the upper surface 21A behind the operation keys 26. The opening 213 is closed by the lamp cover 24.

As illustrated in FIG. 1, an expanded portion 211 is provided at a position of the upper surface 21A before the operation keys 26. An opening 212 is further provided behind the expanded portion 211. The projection lens 5 is disposed within the external housing 2 at a position corresponding to the area where the expanded portion 211 and the opening 212 are formed. A lever 541 of the projection lens 5 is exposed through the opening 212.

As illustrated in FIG. 2, feet 221 provided on the bottom of the lower case 22 are brought into contact with the installation surface of a desk or the like when the projector 1 is placed thereon. An air outlet port 224 through which the inside air is discharged is provided in the −X side surface of the lower case 22.

As illustrated in FIG. 2, each of the upper case 21 and the lower case 22 has a plurality of bosses such as clamping portions (first clamping portion 27 and second clamping portion 28) projecting from the corresponding inner surface of the uppercase 21 and the lower case 22. The first clamping portion 27 and the second clamping portion 28 are so constructed as to hold a holding unit 6 (described later). The structure on the inner surfaces of the upper case 21 and the lower case 22 will be described in detail later.

The front case 23 constitutes the front part of the external housing 2. As illustrated in FIG. 1, the front case 23 has an expanded portion 231 so configured as to fit with the shape of the expanded portion 211 of the upper case 21, and a projection opening 232 disposed below the expanded portion 231 as an opening through which light projected from the projection lens 5 passes. The front case 23 further has an expanded portion 233 disposed at the lower edge of the projection opening 232 as a portion projecting toward the front.

As illustrated in FIG. 1, the side case 25 disposed between the upper case 21 and the lower case 22 constitutes a part of the +X side surface of the external housing 2. The side case 25 has an air inlet port 251 through which the outside air is introduced.

The control unit includes a CPU (central processing unit), a ROM (read only memory), a RAM (random access memory), and others to function as a computer. The control unit controls the operation of the projector 1.

Structure of Optical Unit

The optical unit 3 performs optical processing for light emitted from the light source device 31 and projects the processed light under the control of the control unit.

Figure 3:
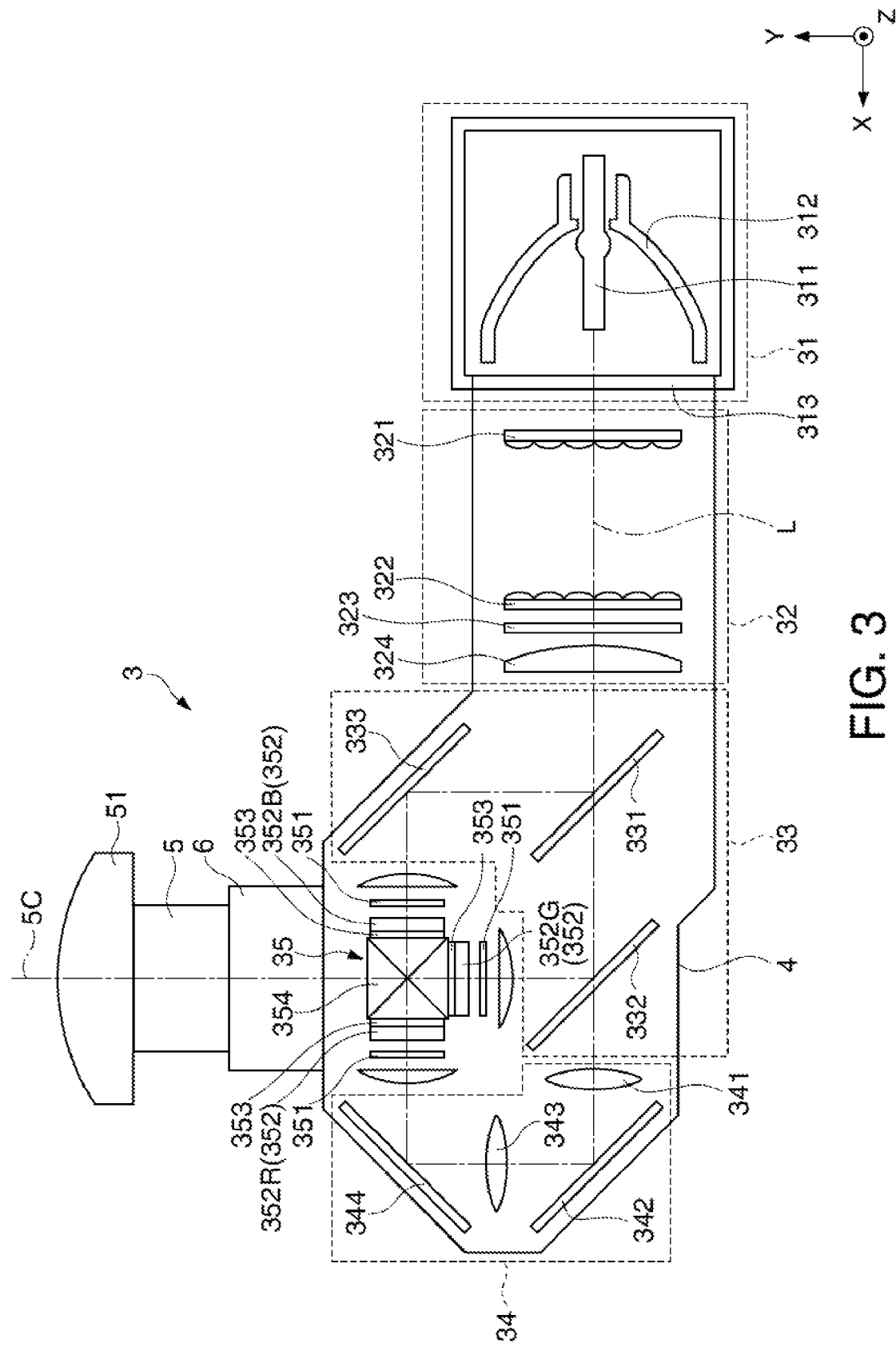
FIG. 3 schematically illustrates the general structure of an optical unit according to the embodiment.
Figure 4:
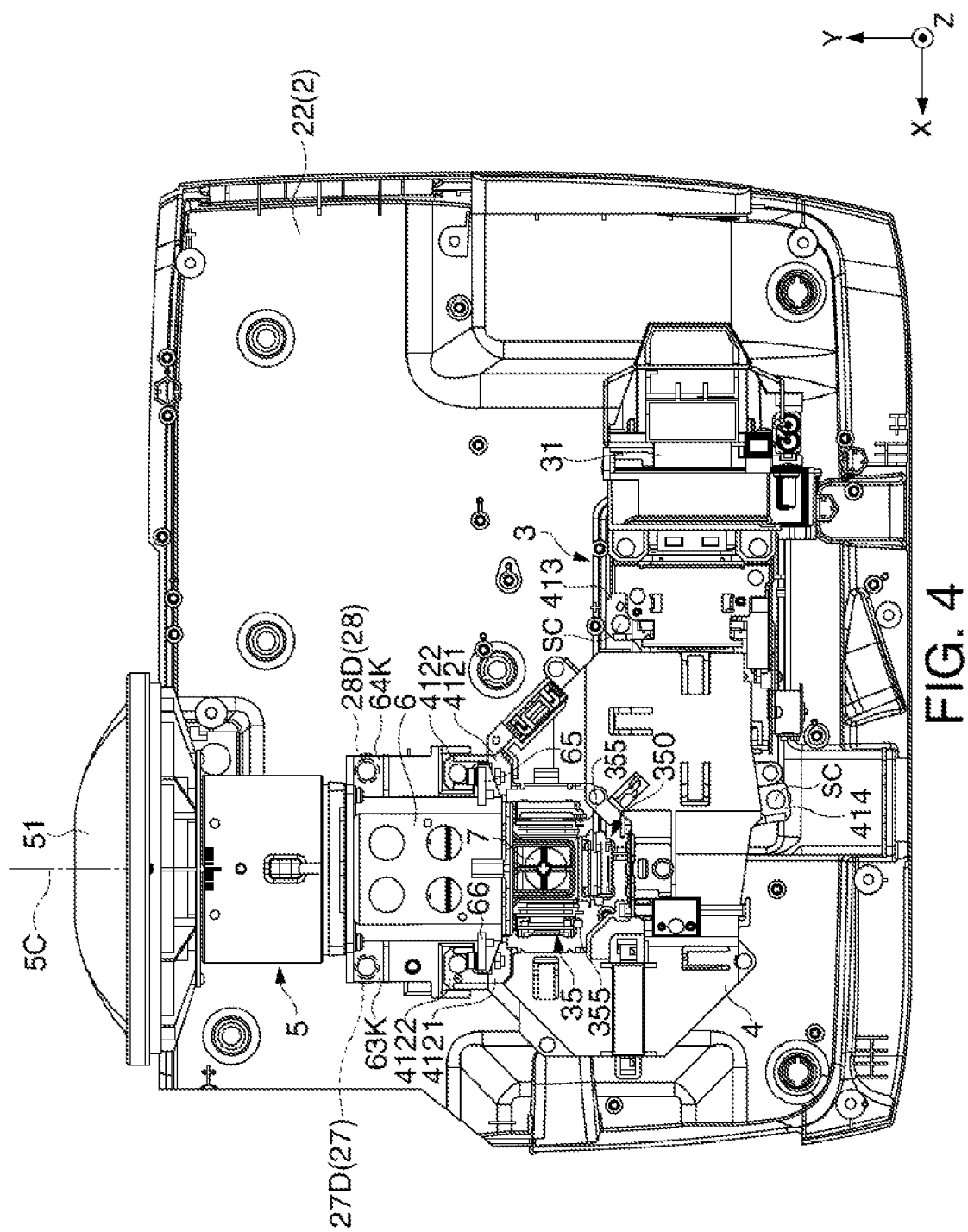
FIG. 4 is a plan view of a lower case and the optical unit according to the embodiment as viewed from above.

FIG. 3 schematically illustrates the general structure of the optical unit 3. FIG. 4 is a plan view of the lower case 22 and the optical unit 3 as viewed from above.

As illustrated in FIGS. 3 and 4, the optical unit includes the light source device 31, an integrator illumination system 32, a color separation system 33, a relay system 34, an electro-optic device 35, an optical component housing 4 accommodating the components in the range from the light source device 31 up to the electro-optic device 35 at predetermined positions on the optical path, the projection lens 5, and the holding unit 6.

As illustrated in FIGS. 3 and 4, the components of the optical unit 3 are sequentially disposed in the order from the light source device 31 to the projection lens 5 in the direction from one end to the other end of the optical unit 3, while forming a substantially L shape in the plan view.

As illustrated in FIG. 3, the light source device 31 has a discharge-type light source 311 constituted by an extra-high pressure mercury lamp, a metal halide lamp or other types, a reflector 312, a collimating lens 313 as a light transmitting member, and others. The light source device 31 reflects light emitted from the light source 311 by using the reflector 312, equalizes the emission direction of the reflected light by using the collimating lens 313, and supplies the collimated light toward the integrator illumination system 32.

The integrator illumination system 32 has a first lens array 321, a second lens array 322, a polarization converting element 323, and a stacking lens 324.

The first lens array 321 is an optical element which divides light emitted from the light source device 31 into a plurality of partial lights, and has a plurality of small lenses disposed in matrix in a plane crossing an optical axis L of the light emitted from the light source device 31 substantially at right angles.

The second lens array 322 has a structure substantially similar to that of the first lens array 321, and stacks the partial lights received from the first lens array 321 on the surfaces of liquid crystal panels 352 (described later) in cooperation with the stacking lens 324.

The polarization converting element 323 has a function of converting random polarized lights received from the second lens array 322 into substantially one type of polarized lights processible by the liquid crystal panels 352.

The color separation system 33 includes two dichroic mirrors 331 and 332 and a reflection mirror 333, and has a function of separating the light received from the integrator illumination system 32 into three color lights of red light (hereinafter referred to as "R light", green light (hereinafter referred to as "G light", and blue light (hereinafter referred to as "B light").

The relay system 34 includes an entrance side lens 341, a relay lens 343, and reflection mirrors 342 and 344, and has a function of guiding the R light separated by the color separation system 33 toward a liquid crystal panel 352R for R light. While the relay system 34 of the optical unit 3 guides the R light in this embodiment, the relay system 34 may guide other color lights such as the B light.

The electro-optic device 35 modulates the respective color lights separated by the color separation system 33 according to image information, and combines the modulated color lights. As illustrated in FIG. 3, the electro-optic device 35 includes entrance side polarization plates 351, the liquid crystal panels 352 as light modulation devices, exit side polarization plates 353, a cross dichroic prism 354, frames 355, and a support member 7 (frames 355 and support member 7 are shown in FIG. 4). The liquid crystal panels 352, the exit side polarization plates 353, the cross dichroic prism 354, the frames 355, and the support member 7 constitute an optical device 350.

The entrance side polarization plates 351, the liquid crystal panels 352, and the exit side polarization plates 353 are provided for each of the three color lights (the liquid crystal panels 352 for the respective colors are particularly referred to as liquid crystal panel 352R for R light, liquid crystal panel 352G for G light, and liquid crystal panel 352B for B light). The entrance side polarization plates 351 are disposed on the optical component housing 4. The liquid crystal panels 352 and the exit side polarization plates 353 are attached to the cross dichroic prism 354 via the frames 355.

The cross dichroic prism 354 has a substantially square shape in the plan view produced by affixing four rectangular prisms. Two dielectric multilayer films are provided on the interfaces between the respective rectangular prisms.

The cross dichroic prism 354 has three light entrance side end surfaces to each of which the entrance side polarization plate 351 and the liquid crystal panel 352 for the corresponding color light are attached. The cross dichroic prism 354 reflects the color lights modulated by the liquid crystal panels 352R and 352B by using the dielectric multilayer films, and transmits the color light modulated by the liquid crystal panel 352G to combine the respective color lights.

Figure 5:
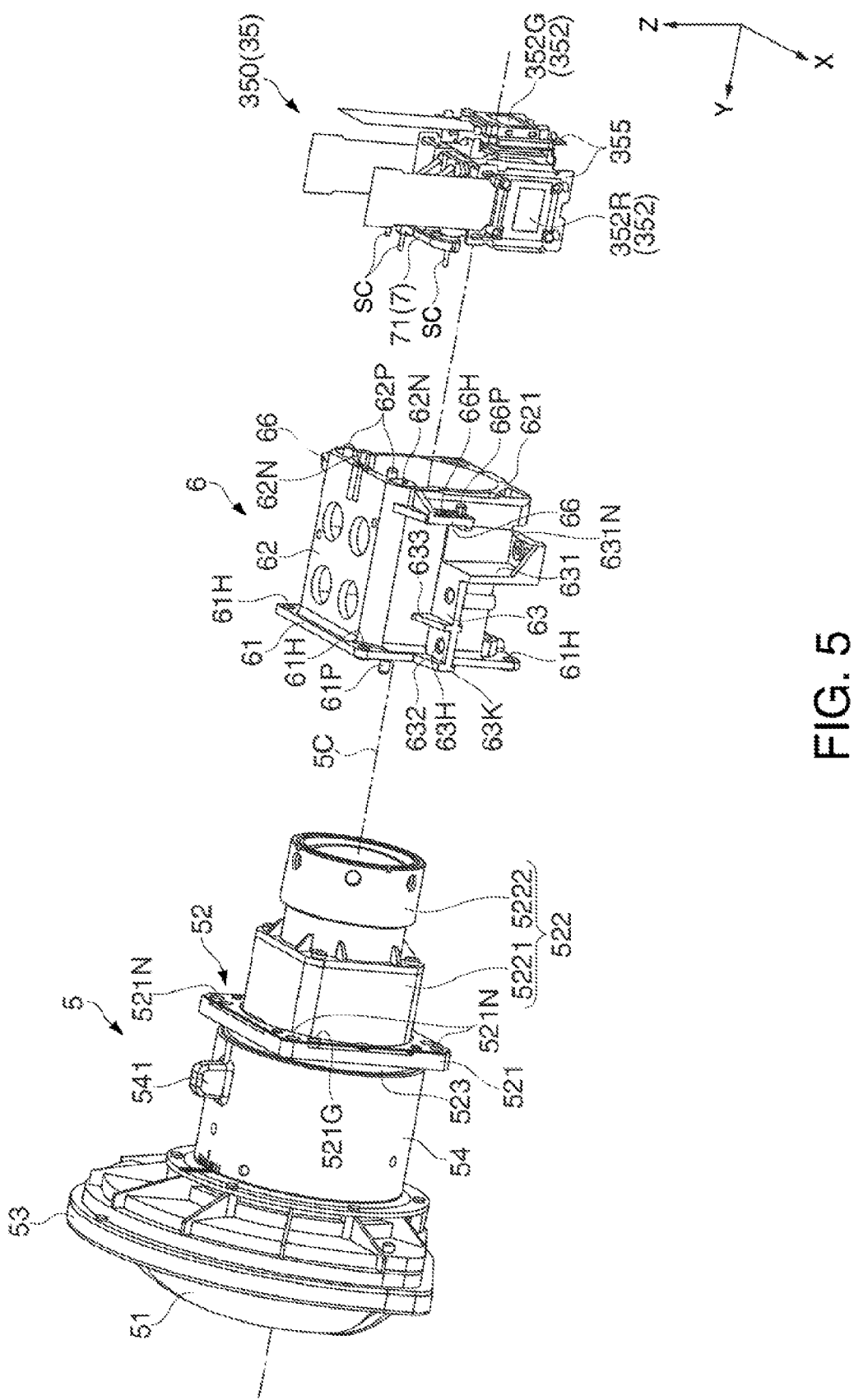
FIG. 5 is a perspective view of an optical device, a projection lens, and a holding unit according to the embodiment.
Figure 6:
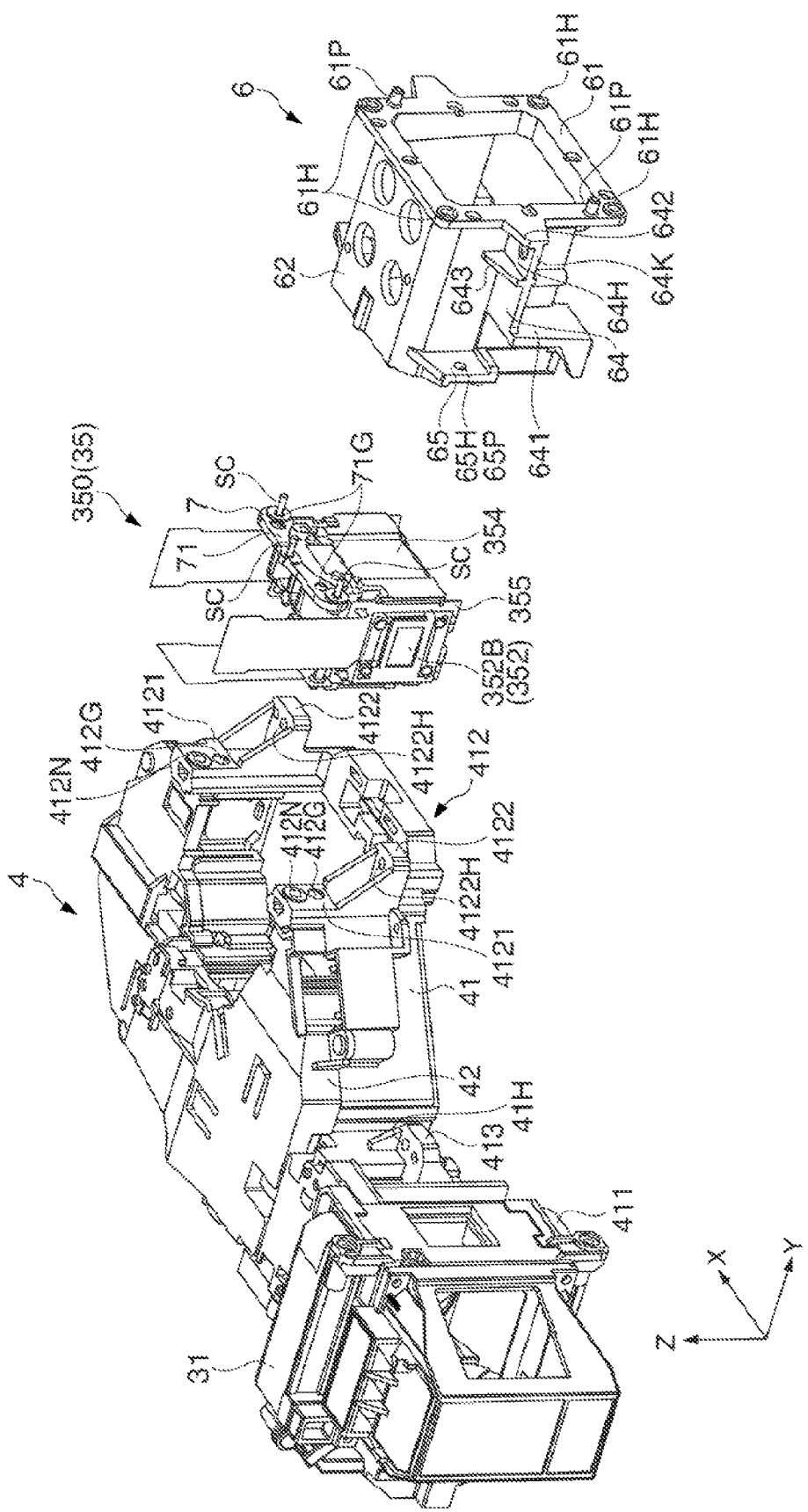
FIG. 6 is a perspective view of an optical component housing, the optical device, and the holding unit according to the embodiment.

FIG. 5 is a perspective view illustrating the optical device 350, the projection lens 5, and the holding unit 6. FIG. 6 is a perspective view illustrating the optical component housing 4, the optical device 350, and the holding unit 6, corresponding to a figure as viewed in the direction opposite to the viewing direction of FIG. 5.

Each of the frames 355 is made of sheet metal, and so constructed as to hold the corresponding liquid crystal panel 352 as illustrated in FIGS. 5 and 6.

The support member 7 attached to the holding unit 6 supports the cross dichroic prism 354 to which the liquid crystal panels 352 and the exit side polarization plates 353 are attached.

As illustrated in FIGS. 5 and 6, the support member 7 is fixed to the upper surface of the cross dichroic prism 354 crossing the three light entrance side end surfaces thereof.

As illustrated in FIG. 6, the support member 7 has an extended portion 71 extended along the X-Z plane. The extended portion 71 has three insertion holes penetrating the extended portion 71 in the Y direction as holes through which screws SC are inserted. These insertion holes are disposed at the center and in the vicinity of the +X side end and the −X side end of the extended portion 71. Two guide holes 71G are formed between the adjoining insertion holes of the extended portion 71 as positioning holes for the support member 7 with respect to the holding unit 6.

As illustrated in FIG. 6, the optical component housing 4 has a lower housing 41 and an upper housing 42.

The lower housing 41 is made of high heat-resistant material such as BMC (bulk molding compound), and has a bottom surface disposed along the bottom surface of the lower case 22, and a side surface rising from the edge of the bottom surface of the lower housing 41, forming a box shape whose top surface is opened.

The one end (−X side end) of the lower housing 41 forms a light source accommodating portion 411 in which the light source device 31 is detachably accommodated, while the other end of the lower housing 41 forms an optical device accommodating portion 412 in which the optical device 350 is accommodated. A plurality of grooves are formed in the inner wall surface of the side surface of the lower housing 41 between the light source accommodating portion 411 and the optical device accommodating portion 412. The side edges of the respective optical components such as the first lens array 321 are inserted through these grooves to be positioned.

As illustrated in FIG. 6, the optical device accommodating portion 412 has an opening in the +Y side surface thereof, and a pair of walls 4121 at both ends of this opening.

The +Y side surface of each of the two walls 4121 has a screw hole 412N and a guide hole 412G. Each of the walls 4121 further has a projection 4122 disposed below the guide hole 412G and projecting toward the front. Each of the projections 4122 has an insertion hole 4122H penetrating the corresponding projection 4122 in the up-down direction as a hole into which a screw SC is inserted.

The lower housing 41 has two fixing portions 413 and 414 projecting from the side surface of the lower housing 41.

More specifically, as illustrated in FIG. 6, the fixing portion 413 projects from the front part (+Y side) of the side surface of the lower housing 41 in the vicinity of the light source device 31. On the other hand, as illustrated in FIG. 4, the fixing portion 414 projects from the −X side rear part (−Y side) of the side surface of the lower housing 41 with respect to a virtual vertical plane containing the optical axis 5C. Therefore, the fixing portions 413 and 414 are disposed on the upstream side of the electro-optic device 35 with respect to the direction of the optical path, and on the −X side with respect to the virtual vertical plane containing the optical axis 5C. Each of the fixing portions 413 and 414 has an insertion hole 41H (insertion hole 41H of the fixing portion 414 is not shown) as a hole into which a screw SC (see FIG. 4) is inserted.

The upper housing 42 is made of synthetic resin such as PC (polycarbonate) containing glass fibers, and so configured as to cover the upper opening of the lower housing 41 as illustrated in FIG. 6. The upper housing 42 has a concave above the optical device accommodating portion 412 as a space into which the optical device 350 is inserted. The upper housing 42 having this structure is fixed to the lower housing 41 by screws.

The projection lens 5 has a plurality of lenses (a part of which is not shown) disposed along the optical axis 5C (see FIG. 3) to project an enlarged image corresponding to the light received from the cross dichroic prism 354 onto the screen. According to this embodiment, the projection lens 5 has a lens having a short focus and providing wide angles, and therefore can perform proximity projection. The details of the structure of the projection lens 5 will be described later.

As illustrated in FIG. 4, the holding unit 6 is disposed on the downstream side of the electro-optic device 35 with respect to the direction of the optical path. The holding unit 6 which holds the projection lens 5 and the optical device 350 is attached to the optical component housing 4. The details of the structure of the holding unit 6 will be described later.

Attachment Structure of Projection Lens

The attachment structure of the projection lens 5 is now explained.

Initially, the details of the projection lens 5 are discussed.

As illustrated in FIG. 5, the projection lens 5 includes a front lens 51 disposed at the downstream end position in the plural lenses with respect to the direction of the optical path, a lens barrel 52, a plurality of lenses (not shown) disposed within the lens barrel 52, a lens frame 53, and a focus ring 54. The focus ring 54 corresponds to a rotary member which shifts at least one lens of the plural lenses.

The front lens 51 is a lens associated with formation of a wide-angle image, and has an external size larger than the external size of the lens barrel 52. As illustrated in FIG. 5, the front lens 51 has a shape whose lower end is cut away, in which shape light entering the projection lens 5 travels upward from the front lens 51.

As illustrated in FIG. 5, the lens barrel 52 has a flange 521, an upstream side forming portion 522 which corresponds to a part of the lens barrel 52 on the upstream side (−Y side) of the flange 521 with respect to the direction of the optical path, and a downstream side forming portion 523 which corresponds to a part of the lens barrel 52 on the downstream side (+Y side) of the flange 521 with respect to the direction of the optical path.

The flange 521 positioned substantially at the center of the lens barrel 52 in the direction of the optical axis 5C projects in a direction substantially perpendicular to the optical axis 5C, and has a rectangular shape in the plan view. The flange 521 having the rectangular shape in the plan view has screw holes 521N at the four corners of the flange 521. The projection lens 5 is supported by the holding unit 6 via the flange 521 positioned substantially at the center of the lens barrel 52. Thus, the projection lens 5 is clamped at a position close to its center of gravity. The flange 521 has a guide hole 521G as a positioning hole for the projection lens 5 with respect to the holding unit 6.

As illustrated in FIG. 5, the upstream side forming portion 522 has a prism portion 5221 which has a rectangular parallelepiped external shape and extends from the upstream side of the flange 521 with respect to the direction of the optical path, and a cylindrical portion 5222 which has a cylindrical external shape and extends from the upstream side of the prism portion 5221 with respect to the direction of the optical path.

The downstream side forming portion 523, whose details are not shown, has a cylindrical columnar external shape, and contains a not-shown rotary column, a not-shown lens associated with focus control, and others.

The lens frame 53 which holds the front lens 51 is fixed to the downstream side forming portion 523 via a not-shown member.

The focus ring 54 has a columnar shape into which the downstream side forming portion 523 is inserted. The focus ring 54 is provided between the flange 521 and the lens frame 53 in such a manner as to be rotatable with respect to the lens barrel 52.

As illustrated in FIG. 5, the lever 541 projecting in a direction crossing the optical axis 5C is provided on the outer circumferential surface of the focus ring 54. As noted above, the lever 541 is exposed through the opening 212 of the upper case 21 (see FIG. 1).

According to the projection lens 5 having this structure, the focus ring 54 revolves in accordance with the shift of the lever 541 clamped and operated by hand, whereby the rotary column disposed within the downstream side forming portion 523 rotates. As a result, the lens associated with the focus control shifts along with the guide of the rotary column to perform focus control. According to this embodiment, the projector 1 performs zoom control by using an electronic zoom provided for electrical zoom adjustment.

Structure of Holding Unit

The details of the holding unit 6 are now explained.

The holding unit 6 is made of metal such as aluminum, and is column-shaped as illustrated in FIG. 5. The projection lens 5 is attached to the +Y side end of the holding unit 6, while the optical device 350 is attached to the −Y side end of the holding unit 6.

As illustrated in FIGS. 5 and 6, the holding unit 6 has a flange support portion 61 which supports the flange 521, and a lens barrel insertion portion 62 through which the upstream side forming portion 522 of the lens barrel 52 is inserted. A pair of ribs 63 and 64, and a pair of projections 65 and 66 are provided on the outer surface of the lens barrel insertion portion 62. The material forming the holding unit 6 is not limited to metal but may be synthetic resin or others containing glass fibers or the like and having high rigidity.

As illustrated in FIG. 5, the flange support portion 61 disposed opposed to the flange 521 of the projection lens 5 has a rectangular shape in the plan view similarly to the flange 521. The flange support portion 61 has a guide pin 61P inserted into the guide hole 521G of the flange 521, and insertion holes 61H through which screws engaging with the screw holes 521N of the flange 521 are inserted.

The lens barrel insertion portion 62 has a smaller rectangular parallelepiped shape than the shape of the flange support portion 61 in the plan view. The optical device 350 is attached to the −Y side end (attachment portion 621) of the lens barrel insertion portion 62.

As illustrated in FIG. 5, the attachment portion 621 has guide pins 62P inserted into the guide holes 71G of the support member 7 (see FIG. 6), and screw holes 62N engaging with the screws SC (see FIG. 6) projecting from the insertion holes of the extended portion 71.

As illustrated in FIG. 5, the rib 63 disposed on the +X side of the lens barrel insertion portion 62 projects from the flange support portion 61 and the lens barrel insertion portion 62.

The rib 63 has a plate-shaped clamped portion 63K extending along the X–Y plane containing the optical axis 5C, and an L-shaped projection 631 disposed on the rear side of the clamped portion 63K.

The clamped portion 63K is apart clamped by the first clamping portion 27 (described later, see FIG. 2) of the external housing 2, and has a through hole 63H penetrating the clamped portion 63K in the up-down direction in the vicinity of the flange support portion 61. Reinforcing portions 632 connected with the clamped portion 63K and the flange support portion 61 are provided above and below the clamped portion 63K before the through hole 63H. Similarly, reinforcing portions 633 connected with the clamped portion 63K and the lens barrel insertion portion 62 are provided above and below the clamped portion 63K behind the through hole 63H.

The projection 631 has an L shape which extends downward from the rear end of the clamped portion 63K and further extends toward the rear. A screw hole 631N is provided at a position of the extended rear part of the projection 631. The extended rear part of the projection 631 is disposed below the +X side projection 4122 (see FIG. 6) of the optical component housing 4 such that the position of the screw hole 631N agrees with the position of this insertion hole 4122H.

As illustrated in FIG. 6, the rib 64 is disposed on the −X side of the lens barrel insertion portion 62 and so configured that the shapes of the rib 64 and the rib 63 become substantially symmetric. More specifically, the rib 64 has a clamped portion 64K and a projection 641 similarly to the rib 63. The clamped portion 64K has a through hole 64H. Reinforcing portions 642 and 643 are provided before and behind the through hole 64H, respectively.

The clamped portion 64K is a part clamped by the second clamping portion 28 (see FIG. 2) of the external housing 2. The extended rear part of the projection 641 is disposed below the −X side projection 4122 (see FIG. 6) of the optical component housing 4 such that the position of a screw hole (not shown) of the projection 641 agrees with the position of this insertion hole 4122H.

Accordingly, the clamped portions 63K and 64K are provided on one and the other sides, respectively, of the virtual vertical plane containing the optical axis 5C such that the virtual vertical plane is positioned between the hold portions 63K and 64K.

As illustrated in FIG. 6, the projection 65 is disposed on the −X side of the lens barrel insertion portion 62 and provided in correspondence with the −X side wall 4121 of the optical component housing 4. The projection 65 has a guide pin 65P inserted into the guide hole 412G of the wall 4121, and an insertion hole 65H into which a screw engaging with the screw hole 412N of the wall 4121 is inserted.

As illustrated in FIG. 5, the projection 66 is disposed on the +X side of the lens barrel insertion portion 62 and provided in correspondence with the +X side wall 4121 of the optical component housing 4. Similarly to the projection 65, the projection 66 has a guide pin 66P inserted into the guide hole 412G of the wall 4121, and an insertion hole 66H into which a screw engaging with the screw hole 412N of the wall 4121 is inserted.

As noted above, the optical device 350 is attached to the attachment portion 621 (−Y side end) of the holding unit 6, while the projection lens 5 is attached to the +Y side end of the holding unit 6. The holding unit 6 to which the optical device 350 and the projection lens 5 are fixed is attached to the walls 4121 of the optical component housing 4 via screws inserted through the insertion holes 65H and 66H and the insertion holes 4122H. Under this condition, the optical unit 3 is attached to the lower case 22.

Attachment Structure of Optical Unit

Initially, the structures on the inner surfaces of the upper case 21 and the lower case 22 are explained.

As noted above, the first clamping portion 27 and the second clamping portion 28 are provided on each of the upper case 21 and the lower case 22.

Returning to FIG. 2, the first clamping portion 27 has an upper clamping portion 27U projecting from the inner surface of the upper case 21, and a lower clamping portion 27D projecting from the inner surface of the lower case 22, and holds the clamped portion 63K in the direction perpendicular to the optical axis 5C. A screw hole is provided in the lower surface of the upper clamping portion 27U, while an insertion hole through which a screw is inserted is provided in the upper surface of the lower clamping portion 27D having a column shape. The screw hole of the upper clamping portion 27U and the insertion hole of the lower clamping portion 27D are disposed at positions corresponding to the position of the through hole 63H of the clamped portion 63K.

The second clamping portion 28 has an upper clamping portion 28U projecting from the inner surface of the upper case 21, and a lower clamping portion 28D projecting from the inner surface of the lower case 22, and holds the clamped portion 64K (see FIG. 6) in the direction perpendicular to the optical axis 5C. A screw hole is provided in the lower surface of the upper clamping portion 28U, while an insertion hole through which a screw is inserted is provided in the upper surface of the lower clamping portion 28D having a column shape. The screw hole of the upper clamping portion 28U and the insertion hole of the lower clamping portion 28D are disposed at positions corresponding to the position of the through hole 64H of the clamped portion 64K.

Accordingly, the first clamping portion 27 and the second clamping portion 28 are disposed on one and the other sides, respectively, of the virtual vertical plane containing the optical axis 5C such that the virtual vertical plane is positioned between the first and second clamping portions 27 and 28.

As illustrated in FIG. 2, the lower case 22 has unit fixing bosses 222 and 223 and case fixing bosses 225, each of which bosses 222, 223 and 225 projects upward (+Z direction).

The unit fixing bosses 222 and 223 are bosses to which the optical unit 3 is temporarily fixed. As illustrated in FIG. 2, the unit fixing boss 222 is disposed below the fixing portion 414 of the optical component housing 4, while the unit fixing boss 223 is disposed below the fixing portion 413 (see FIG. 4) of the optical component housing 4. As illustrated in FIG. 2, each of the unit fixing bosses 222 and 223 has a dual-layered shape produced by a base cylindrical projection and a tip cylindrical projection having a smaller diameter than that of the base cylindrical projection. Each of the tip cylindrical projections of the unit fixing bosses 222 and 223 has a screw hole associated with the corresponding insertion hole 41H of the fixing portions 413 and 414. Each of the base cylindrical projections of the unit fixing bosses 222 and 223 has a column shape so that no sink mark is produced during molding.

Each of the case fixing bosses 225 has a column shape whose upper surface is provided with an insertion hole through which a screw is inserted similarly to the lower clamping portions 27D and 28D. The plural case fixing bosses 225 are disposed in the vicinity of the corners of the lower case 22 or other positions. The details of the case fixing bosses 225 are not explained herein.

The upper case 21 has case fixing bosses (not shown) at positions corresponding to the case fixing bosses 225 of the lower case 22. Each of these case fixing bosses has a screw hole corresponding to the insertion hole of the associated case fixing boss 225 of the lower case 22.

The procedures performed for fixation of the optical unit 3 are now explained.

As illustrated in FIG. 4, the optical unit 3 is temporarily fixed to the unit fixing bosses 222 and 223 (see FIG. 2) via the screws SC inserted into the insertion holes 41H (see FIG. 6) of the fixing portions 413 and 414.

The optical unit 3 temporarily fixed to the lower case 22 is finally secured by fixation between the upper case 21 and the lower case 22, and located at a predetermined position in a stable condition.

More specifically, the upper case 21 is fixed to the lower case 22 via screws inserted from the insertion holes of the lower clamping portions 27D and 28D and the case fixing bosses 225 and tightened into the screw holes of the upper clamping portions 27U and 28U and the case fixing bosses of the upper case 21.

In this condition, the optical unit 3 is finally fixed by the screws inserted from the insertion holes of the lower clamping portions 27D and 28D and tightened into the screw holes of the upper clamping portions 27U and 28U.

Figure 7:
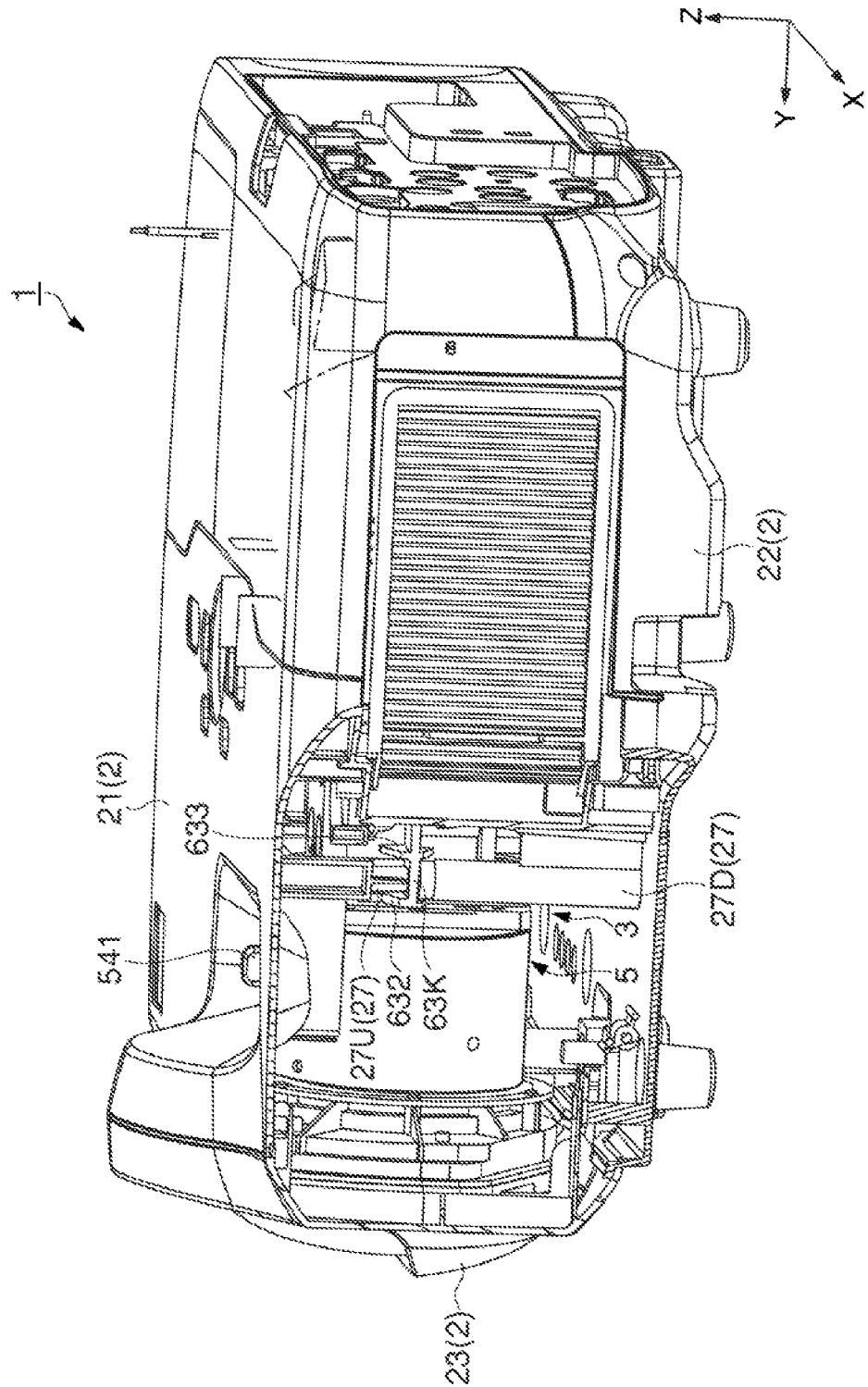
FIG. 7 is a perspective view of the projector according to the embodiment.

FIG. 7 is a perspective view of the projector 1, including a cross-sectional view of a part of the projector 1.

As illustrated in FIG. 7, the clamped portion 63K is clamped by the first clamping portion 27 (upper clamping portion 27U and lower clamping portion 27D) by fixation between the upper case 21 and the lower case 22. On the other hand, the clamped portion 64K is clamped by the second clamping portion 28 (upper clamping portion 28U and lower clamping portion 28D) by fixation between the upper case 21 and the lower case 22, which condition is not shown in the figure.

Accordingly, the holding unit 6 which holds the projection lens 5 is clamped by the first clamping portion 27 and the second clamping portion 28 provided on the external housing 2 in a direction substantially perpendicular to the optical axis 5C. In this case, both sides of the holding unit 6 with respect to the virtual vertical plane containing the optical axis 5C can be clamped with the virtual vertical plane located between the sides of the holding unit 6.

According to the projector 1 in this embodiment, the following advantages can be offered.

(1) The holding unit 6 which holds the projection lens 5 is clamped by the clamping portions (first clamping portion 27 and second clamping portion 28) projecting from the external housing 2 in the direction perpendicular to the optical axis 5C. In this case, shift of the projection lens 5 is regulated in the direction perpendicular to the optical axis 5C, wherefore the predetermined position of the projection lens 5 is maintained in a stable condition without positional shift or fall of the projection lens 5 caused by the weight of the projection lens 5 or shock or vibration given to the projector 1. Thus, deterioration of the image quality caused by the weight of the projection lens 5, shock or other conditions can be avoided even when the projector 1 includes the heavy projection lens 5 provided with a short-focus lens capable of performing proximity projection, for example. Accordingly, the projector 1 can achieve projection of high-quality images.

(2) The holding unit 6 can be clamped by fixation between the lower case 22 (second housing) and the upper case 21 (first housing). Thus, the predetermined position of the projection lens 5 can be maintained in a more stable condition along with reduction of the number of components and contribution to space saving than in a structure which constitutes the first clamping portion 27 and the second clamping portion 28 by components other than the external housing 2.

(3) The holding unit 6 which holds the projection lens 5 and the optical device 350 is clamped by the clamping portions. According to this structure, the highly accurate positioning of the projection lens 5 with respect to the optical device 350 can be maintained. Moreover, positional shift or fall of the projection lens 5 caused by the weight of the projection lens 5 or shock or vibration given to the projector 1 can be prevented. Therefore, light modulated by the optical device 350 enters the projection lens 5 with high accuracy, which allows the projector 1 to achieve projection of high-quality images.

(4) After temporary fixation of the optical unit 3 to the lower case 22, the upper case 21 is attached to the lower case 22, in which condition hold of the holding unit 6 is achieved. Accordingly, the manufacture of the projector 1 can be simplified.

The clamped portions 63K and 64K are disposed on the downstream side of the optical device 350 with respect to the direction of the optical path, while the fixing portions 413 and 414 are disposed on the upstream side of the optical device 350 with respect to the direction of the optical path and on one side with respect to the virtual vertical plane containing the optical axis 5C. In other words, the fixing portions 413 and 414 are located on the side opposite to the clamped portions 63K and 64K with respect to the optical device 350 in such positions as not to cross over the optical axis 5C. According to this arrangement, loads such as distortion produced between the optical component housing 4 and the projection lens 5 can be reduced, which loads may be imposed when the clamped portions 63K and 64K are clamped by the clamping portions after temporary attachment between the optical unit 3 and the lower case 22. Therefore, the optical component housing 4 and the projection lens 5 can be highly accurately disposed at the predetermined positions.

Accordingly, simplification of the manufacture of the projector 1, and stable positioning of the projection lens 5 and the optical components contained in the optical component housing 4 at the predetermined locations can be both achieved.

(5) The focus ring 54 is provided on the downstream side of the clamped portions 63K and 64K with respect to the direction of the optical path. Thus, the clamping portions and the clamped portions 63K and 64K can be easily formed even when the projection lens 5 having the function of focus control is provided. When the focus ring 54 is rotated, a force is applied to the projection lens 5 in such a direction that the projection lens 5 falls down. However, since the clamped portions 63K and 64K are disposed in the vicinity of the focus ring 54, the moment applied to the projection lens 5 becomes smaller. Thus, deterioration of the image quality caused by fall of the projection lens 5 during focus control can be reduced.

(6) The first clamping portion 27 and the second clamping portion 28 hold the holding unit 6 from both sides of the holding unit 6 with respect to the optical axis 5C. In this case, shift of the projection lens 5 in the direction perpendicular to the optical axis 5C is regulated on both sides with respect to the optical axis 5C. Thus, positional shift and fall of the projection lens 5 caused by the weight of the projection lens 5 or shock or vibration given to the projector 1 can be further reduced.

(7) According to the structure of the projection lens 5, the flange 521 disposed close to the center of gravity of the projection lens 5 is supported by the holding unit 6, in which condition the holding unit 6 is clamped via the clamped portions 63K and 64K connected with the flange 521. Thus, the predetermined position of the projection lens 5 can be maintained in a more stable condition.

MODIFIED EXAMPLES

This embodiment can be modified in the following manners.

According to this embodiment, the clamping portions hold the holding unit 6. However, the clamping portions may hold the projection lens 5 instead of the holding unit 6. For example, the clamping portions may hold a clamped portion provided on the flange 521 as a part to be clamped by the clamping portions.

According to this embodiment, the first clamping portion 27 and the second clamping portion 28 are equipped as parts on the external housing 2. However, the first and second clamping portions 27 and 28 may be provided separately from the external housing 2.

Additional members (such as insulator and height adjustment spacer) may be provided between the upper clamping portions 27U and 28U and the clamped portions 63K and 64K, or between the lower clamping portions 27D and 28D and the clamped portions 63K and 64K.

While the projector 1 in this embodiment performs zoom control by using an electronic zoom, the function of zoom control may be incorporated in the projection lens 5.

While the projector 1 in this embodiment includes the transmission type liquid crystal panels 352 as a light modulation device, the projector 1 may include reflection type liquid crystal panels.

The light source 311 is not limited to the discharge-type lamp but may be other types of lamp or a solid light source such as a light emitting diode.

The entire disclosure of Japanese Patent Application No. 2011-64035, filed Mar. 23, 2011 is expressly incorporated by reference herein.

What is claimed is:

1. A projector comprising:
   a light source;
   a light modulation device configured to modulate light emitted from the light source according to image information;
   a projection lens configured to project the light modulated by the light modulation device;
   a holding unit that holds the projection lens;
   an external housing that accommodates the projection lens and the holding unit; and
   a clamping portion that projects from the inner surface of the external housing and clamps the projection lens or the holding unit in a direction substantially perpendicular to the optical axis of the projection lens,
   wherein
   the external housing has a first housing and a second housing disposed opposed to each other with respect to a virtual plane containing the optical axis; and
   the clamping portion is provided on each of the first housing and the second housing.

2. The projector according to claim 1, wherein the holding unit has a clamped portion clamped by the clamping portion, and an attachment portion to which the light modulation device is attached.

3. The projector according to claim 1, further comprising:
   an optical component housing that accommodates the light source and the light modulation device, and has a fixing portion fixed to the external housing, wherein the holding unit has a clamped portion clamped by the clamping portion, and is attached to the optical component housing, the clamped portion is disposed at a position shifted from the light modulation device toward the downstream side with respect to the direction of travel of light emitted from the light source, and the fixing portion is disposed at a position shifted from the light modulation device toward the upstream side with respect to the direction of travel of light emitted from the light source and on one side with respect to a virtual vertical plane containing the optical axis.

4. The projector according to claim 2, wherein the projection lens includes:

a lens barrel accommodating a plurality of lenses; and a rotary member configured to shift at least one of the plural lenses by rotation with respect to the lens barrel, and is disposed at a position shifted from the clamped portion toward the downstream side with respect to the direction of travel of light emitted from the light source.

5. The projector according to claim 1, wherein the clamping portion has a first clamping portion and a second clamping portion provided on one and the other side, respectively, of the virtual vertical plane containing the optical axis such that the virtual vertical plane can be located between the first and second clamping portions.

6. The projector according to claim 1, wherein the projection lens has a flange disposed close to the center of gravity of the projection lens; and the projection lens and the holding unit are attached to each other at the flange.

7. A projector comprising:

a light source;

a light modulation device configured to modulate light emitted from the light source according to image information;

a projection lens configured to project light modulated by the light modulation device;

a holding unit that holds the projection lens;

an external housing that accommodates the projection lens and the holding unit; and a clamping portion that projects from the inner surface of the external housing and clamps the holding unit in a direction substantially perpendicular to the optical axis of the projection lens.

* * * * *